United States Patent
Liao et al.

(10) Patent No.: US 11,520,223 B2
(45) Date of Patent: Dec. 6, 2022

(54) ILLUMINATION SYSTEM AND PROJECTION APPARATUS

(71) Applicant: Coretronic Corporation, Hsin-Chu (TW)

(72) Inventors: Chien-Chung Liao, Hsin-Chu (TW); Ming-Tsung Weng, Hsin-Chu (TW); Chen-Wei Fan, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 310 days.

(21) Appl. No.: 16/858,722

(22) Filed: Apr. 27, 2020

(65) Prior Publication Data

US 2021/0048736 A1 Feb. 18, 2021

(30) Foreign Application Priority Data

Aug. 16, 2019 (CN) .......................... 201921330101.X

(51) Int. Cl.
*G03B 21/20* (2006.01)
*G02B 5/02* (2006.01)
(Continued)

(52) U.S. Cl.
CPC ......... *G03B 21/208* (2013.01); *G02B 5/0278* (2013.01); *G02B 27/48* (2013.01); *G03B 21/2033* (2013.01); *H01S 3/005* (2013.01)

(58) Field of Classification Search
CPC .... H04N 9/315; H04N 9/3132; H04N 9/3141; H04N 9/3161; G02B 5/02; G02B 5/0205;
(Continued)

(56) References Cited

U.S. PATENT DOCUMENTS

| 6,594,090 B2 | 7/2003 | Kruschwitz et al. |
| 8,109,638 B2 | 2/2012 | Chen et al. |

(Continued)

FOREIGN PATENT DOCUMENTS

| CN | 105116675 | 12/2015 |
| CN | 106444246 | 2/2017 |

(Continued)

OTHER PUBLICATIONS

"Office Action of U.S. Related U.S. Appl. No. 17/211,747", dated Jan. 20, 2022, pp. 1-17.

(Continued)

*Primary Examiner* — Sultan Chowdhury
(74) *Attorney, Agent, or Firm* — JCIPRNET

(57) ABSTRACT

An illumination system and a projection apparatus are provided. The illumination system includes a coherent light source, an optical module, and a first light-diffusing device. The coherent light source emits a coherent light beam. The optical module and the first light-diffusing device are located on a transmission path of the coherent light beam. The optical module has an optical surface and a light-diffusing surface, and the coherent light beam focuses on a first position through the optical surface of the optical module. The first light-diffusing device is located at the first position or in vicinity of the first position. The coherent light beam passes through the first light-diffusing device so that a diffusion angle of the coherent light beam is sequentially changed. A display frame exhibiting a uniform luminance is thereby provided by the illumination system and the projection apparatus of the invention.

21 Claims, 9 Drawing Sheets

(51) Int. Cl.
*H01S 3/00* (2006.01)
*G02B 27/48* (2006.01)

(58) Field of Classification Search
CPC .... G02B 5/0278; G03B 21/28; G03B 21/145; G03B 21/208; G03B 21/2013; G03B 21/2033; G03B 21/2053
See application file for complete search history.

(56) References Cited

U.S. PATENT DOCUMENTS

| | | | |
|---|---|---|---|
| 11,112,684 B2 | 9/2021 | Liu et al. | |
| 11,163,227 B2 | 11/2021 | Lin et al. | |
| 11,199,765 B2 | 12/2021 | Pan et al. | |
| 2003/0039036 A1* | 2/2003 | Kruschwitz | H04N 9/3132 359/623 |
| 2008/0212034 A1 | 9/2008 | Aksyuk et al. | |
| 2014/0125956 A1* | 5/2014 | Chifu | G03B 33/12 353/31 |
| 2014/0232992 A1 | 8/2014 | Egawa | |
| 2015/0042961 A1* | 2/2015 | Miyamae | H04N 9/3158 353/33 |
| 2017/0227837 A1* | 8/2017 | Okuda | G03B 21/204 |
| 2019/0041736 A1* | 2/2019 | Grunnet-Jepsen | G03B 21/005 |
| 2021/0294200 A1 | 9/2021 | Pan | |
| 2021/0356852 A1 | 11/2021 | Liao et al. | |

FOREIGN PATENT DOCUMENTS

| | | |
|---|---|---|
| CN | 107065413 | 8/2017 |
| JP | 2019061083 | 4/2019 |
| WO | 2018173200 | 9/2018 |
| WO | 2020253166 | 12/2020 |

OTHER PUBLICATIONS

"Office Action of U.S. Related Application No. 17/209,088", dated Dec. 8, 2021, pp. 1-16.

"Office Action of U.S. Related U.S. Appl. No. 17/227,398", dated Feb. 2, 2022, pp. 1-14.

* cited by examiner

ILLUMINATION SYSTEM AND PROJECTION APPARATUS

CROSS-REFERENCE TO RELATED APPLICATION

This application claims the priority benefit of China application serial no. 201921330101.X, filed on Aug. 16, 2019. The entirety of the above-mentioned patent application is hereby incorporated by reference herein and made a part of this specification.

BACKGROUND

Technical Field

The invention relates to an illumination system and a projection apparatus. More particularly, the invention relates to an illumination system and a projection apparatus.

Description of Related Art

Recently, projection apparatuses using solid-state light sources such as light emitting-diodes (LEDs) and laser diodes play a more and more important role on the market. Laser diodes have become the mainstream light source for modern projectors owing to their advantages such as high collimation, high energy, and the capability of converging light sources.

Nevertheless, the laser light beams provided by laser diodes are coherent light beams, and the coherent light beams feature high coherency. When a laser light beam illuminates a lumpy surface of an object (e.g., a projection lens, a reflector, etc.), an optical path difference is generated in the reflected or scattered light owing to the unevenness of the object's surface. Constructive or destructive interference is generated in space as a result, and a spot-shaped speckle is thereby produced on the illuminated surface. Such speckle is an irregular noise-shaped pattern having seemingly irregular bright and dark spots, so the speckle may lead to uneven luminance on the illuminated surface. As such, image quality of the projection apparatus to which such light source is applied is lowered, and users' visual perception is decreased.

The information disclosed in this BACKGROUND section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention provides an illumination system capable of providing an illumination light beam having uniformity.

The invention provides a projection apparatus capable of providing a frame exhibiting favorable image quality.

Other features and advantages of the invention are illustrated by the technical features broadly embodied and described as follows.

In order to achieve one or part of or all of the features, an embodiment of the invention provides an illumination system. The illumination system is configured to provide an illumination light beam and includes a coherent light source, an optical module, a first light-diffusing device, and an actuator. The coherent light source is configured to emit a coherent light beam. The optical module is located on a transmission path of the coherent light beam. The optical module has an optical surface and a light-diffusing surface, and the coherent light beam focuses on a first position through the optical surface of the optical module. The first light-diffusing device is located on the transmission path of the coherent light beam and is located at the first position or in vicinity of the first position. The actuator is electrically connected to the first light-diffusing device and is configured to drive the first light-diffusing device to move. The coherent light beam passes through the first light-diffusing device so that a diffusion angle of the coherent light beam is sequentially changed, and the coherent light beam passes through the optical module and the first light-diffusing device so that the illumination light beam is formed.

In order to achieve one or part of or all of the features, an embodiment of the invention provides a projection apparatus. The projection apparatus includes the illumination system, a light valve, and a projection lens. The illumination system is configured to provide an illumination light beam. The light valve is disposed on a transmission path of the illumination light beam from the illumination system and is configured to convert the illumination light beam into an image light beam. The projection lens is disposed on a transmission path of the image light beam and is configured to project the image light beam out of the projection apparatus.

In view of the above, the embodiments of the invention have at least one of the following advantages or effects. In the embodiments of the invention, the illumination system may generate two different light diffusion effects through arrangement of the light-diffusing surface of the optical module and the first light-diffusing device and accordingly generates faculae exhibiting a uniform luminance, so that the subsequently formed illumination light beam has favorable uniformity. In this way, the projection apparatus adopting the illumination system can provide a display frame exhibiting a uniform luminance, and image quality and a user's visual perception therefore are further improved.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
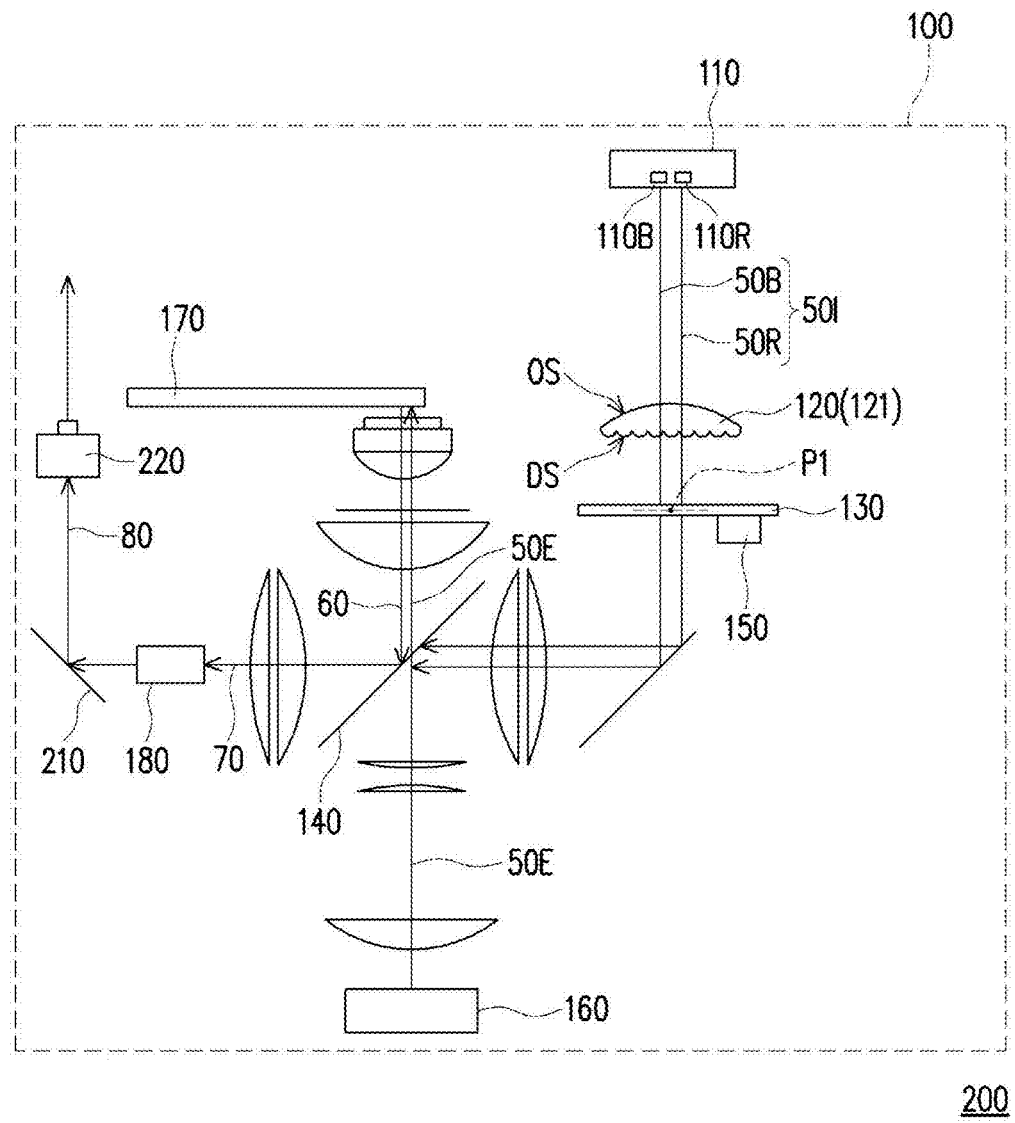
FIG. 1A is a schematic view of a structure of a projection apparatus according to an embodiment of the invention.
Figure 1B:
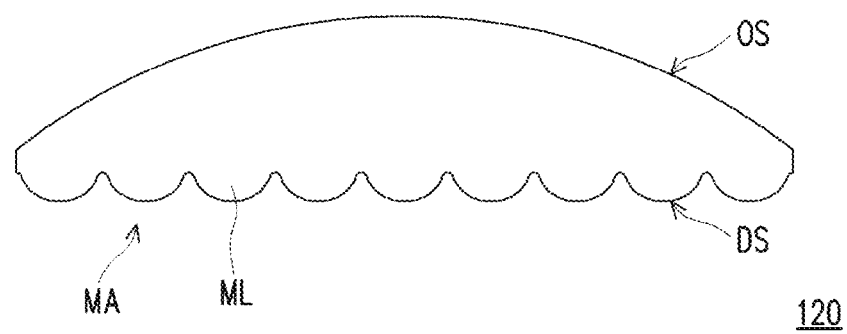
FIG. 1B is a schematic side view of an optical lens of FIG. 1A.
Figure 1C:
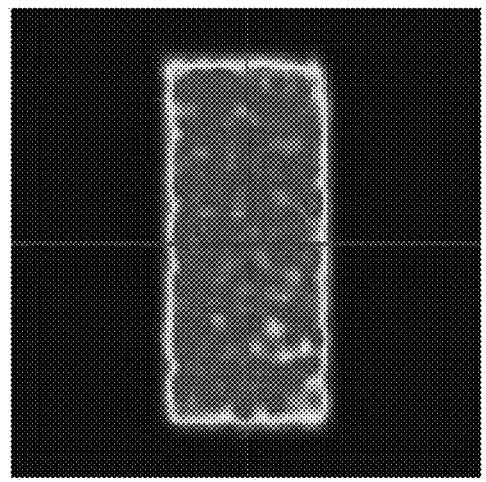
FIG. 1C is a grayscale image of a light shape and luminance distribution of a coherent light beam passing through a light-diffusing surface of FIG. 1A.
Figure 1D:
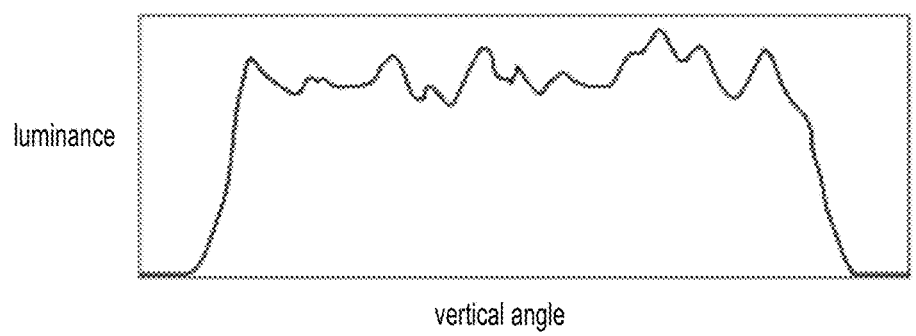
FIG. 1D is curve graph of a luminance distribution of the coherent light beam passing through the light-diffusing surface of FIG. 1A at a vertical angle in an angular space.
Figure 1E:
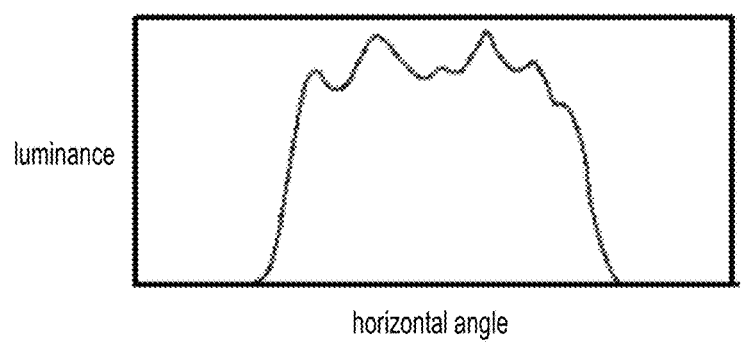
FIG. 1E is curve graph of a luminance distribution of the coherent light beam passing through the light-diffusing surface of FIG. 1A at a horizontal angle in the angular space.
Figure 1F:
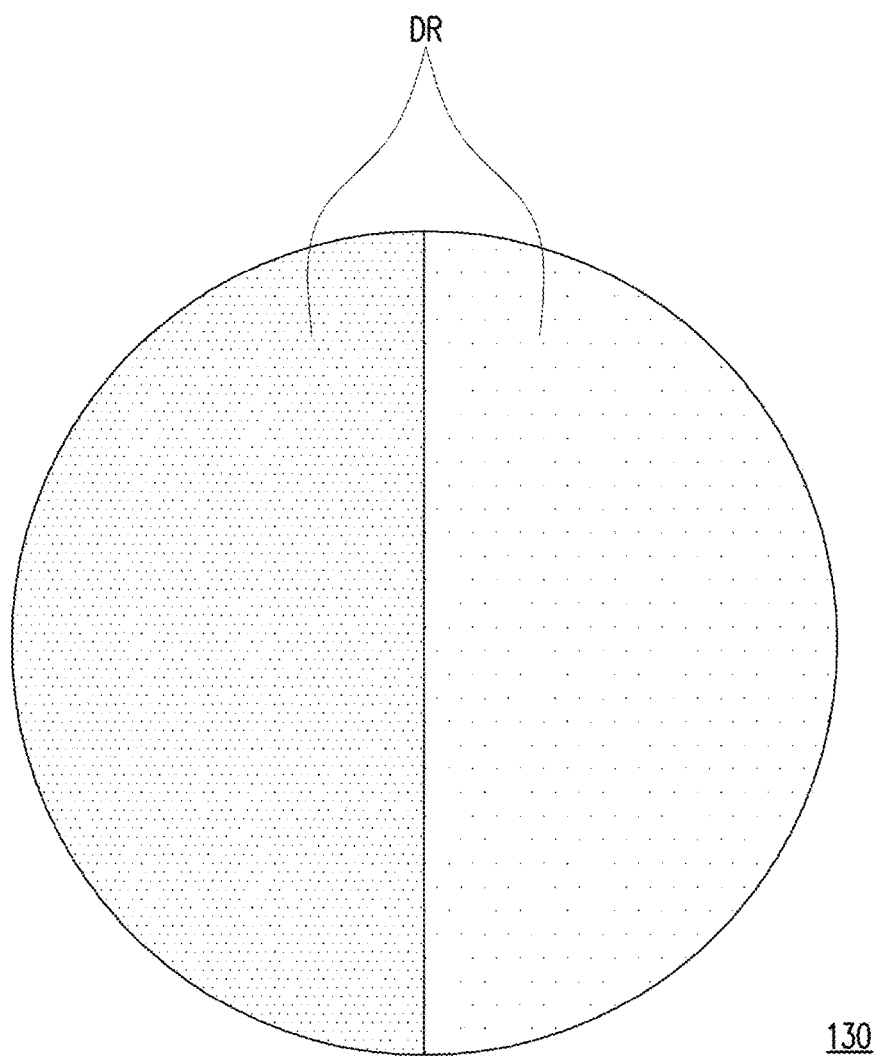
FIG. 1F is a schematic top view of a first light-diffusing device of FIG. 1A.

FIG. 1A is a schematic view of a structure of a projection apparatus according to an embodiment of the invention. FIG. 1B is a schematic side view of an optical lens of FIG. 1A. FIG. 1C is a grayscale image of a light shape and luminance distribution of a coherent light beam passing through a light-diffusing surface of FIG. 1A. FIG. 1D is curve graph of a luminance distribution of the coherent light beam passing through the light-diffusing surface of FIG. 1A at a vertical angle in an angular space. FIG. 1E is curve graph of a luminance distribution of the coherent light beam passing through the light-diffusing surface of FIG. 1A at a horizontal angle in the angular space. FIG. 1F is a schematic top view of a first light-diffusing device of FIG. 1A. With reference to FIG. 1A, in this embodiment, a projection apparatus 200 includes an illumination system 100, a light valve 210, and a projection lens 220. The illumination system 100 is configured to provide an illumination light beam 70. The light valve 210 is disposed on a transmission path of the illumination light beam 70 from the illumination system 100 and is configured to convert the illumination light beam 70 into an image light beam 80. The projection lens 220 is disposed on a transmission path of the image light beam 80 and is configured to project the image light beam 80 out of the projection apparatus 200. For instance, in this embodiment, the light valve 210 is, for example, a digital micro-mirror device (DMD) or a liquid-crystal-on-silicon panel (LCOS panel). Nevertheless, in other embodiments, the light valve 210 may also be a transmissive liquid crystal panel or other types of beam modulators.

Specifically, as shown in FIG. 1A, in this embodiment, the illumination system 100 includes a coherent light source 110, an optical module 120, a first light-diffusing device 130, a light combining unit 140, and an actuator 150. The coherent light source 110 is configured to emit a coherent light beam 50I. The coherent light source 110 includes a plurality of sub-coherent light sources 110R and 110B. The sub-coherent light sources 110R and 110B are configured to respectively emit coherent light beams 50R and 50B, and colors of the coherent light beams 50R and 50B are different from each other. Each of the coherent light beams 50R and 50B travels in the same direction to form the coherent light beam 50I and is incident on the optical module 120 and the first light-diffusing device 130. For instance, in this embodiment, the sub-coherent light sources 110R and 110B of the coherent light source 110 are laser light sources. The coherent light beams 50R and 50B included in the coherent light beam 50I provided by the coherent light source 110 respectively are a red laser light beam and a blue laser light beam having a long wavelength, but the invention is not limited thereto. In another embodiment, the coherent light source 110 may include one laser light source only. In this embodiment, the coherent light beam 50I includes only the blue laser light source having a long wavelength.

Further, as shown in FIG. 1A and FIG. 1B, in this embodiment, the optical module 120 is located on a transmission path of the coherent light beam 50I and is located between the coherent light source 110 and the first light-diffusing device 130. Herein, the optical module 120 has an optical surface OS and a light-diffusing surface DS. Specifically, as shown in FIG. 1A, in this embodiment, the coherent light beam 50I focuses on a first position P1 through the optical surface OS of the optical module 120 and is spatially diffused and redistributed through the light-diffusing surface DS of the optical module 120.

For instance, as shown in FIG. 1A and FIG. 1B, in this embodiment, the optical module 120 may be an optical lens 121 and is a fixed member. More specifically, as shown in FIG. 1A, in this embodiment, the coherent light beam 50I focuses on an equivalent focus through a surface of the optical lens 121 facing the coherent light source 110. That is, the equivalent focus of the optical lens 121 is the first position P1, and the surface of the optical lens 121 facing the coherent light source 110 is the optical surface OS.

In another aspect, a micro lens array MA is formed on the other surface of the optical lens 121 facing away from the coherent light source 110. In this way, when the coherent light beam 50I passes through the micro lens array MA, since the micro lens array MA has a plurality of micro lenses ML and the coherent light beam 50I is highly collimated, the coherent light beam 50I may be spatially diffused and redistributed after passing through the micro lens array MA owing to differences in angles of refraction generated by differences in distances among micro lenses ML located on different positions. In other words, the other surface of the optical lens 121 facing away from the coherent light source 110 and on which the micro lens array MA is formed is the light-diffusing surface DS. Moreover, a spatial distribution of the coherent light beam 50I passing through the micro lens array MA may be adjusted by controlling center spacings among the plurality of micro lenses ML of the micro lens array MA and a curvature of each of the micro lenses ML.

Further, as shown in FIG. 1C to FIG. 1E, in this embodiment, when the center spacings among the plurality of micro lenses ML of the micro lens array MA or the curvatures of the micro lenses ML are identical, intensity of the coherent light beam 50I at each angle in the angular space is equal. In this way, the coherent light beam 50I may be diffused and redistributed in the angular space after passing through the light-diffusing surface DS of the optical module 120.

In another aspect, as shown in FIG. 1A, in this embodiment, the first light-diffusing device 130 is located on the transmission path of the coherent light beam 50I and is located at the first position P1 or in vicinity of the first position P1. For instance, in this embodiment, a distance between the first light-diffusing device 130 and the first position P1 is less than 5 millimeters. As such, since the first light-diffusing device 130 is located on the equivalent focus (i.e., the first position P1) of the optical lens 121 or in the vicinity of the equivalent focus (i.e., the first position P1) of the optical lens 121, a size of a facula of the coherent light beam 50I diffused through the first light-diffusing device 130 is not too large to affect light receiving efficiency of a following light uniforming device.

Further, as shown in FIG. 1F, in this embodiment, the first light-diffusing device 130 is a diffusion plate having a surface filled with particles of different roughness. Moreover, as shown in FIG. 1A, in this embodiment, the actuator 150 is electrically connected to the first light-diffusing device 130 and is configured to drive the first light-diffusing device 130 to move. For instance, in this embodiment, the actuator 150 may be configured to set the first light-diffusing device 130 to move back and forth in one direction or is configured to drive the first light-diffusing device 130 to rotate at a first frequency. As such, different regions on the first light-diffusing device 130 may enter into the transmission path of the coherent light beam 50I by turns. Moreover, a diffusion angle of the coherent light beam 50I is sequentially changed when the coherent light beam 50I passes through the first light-diffusing device 130, and that a facula distribution of the coherent light beam 50I may be changed over time.

Further, as shown in FIG. 1A, in this embodiment, the coherent light beam 50I includes the coherent light beams 50R and 50B of different colors, and light-emitting expansion angles of the coherent light beams 50R and 50B of different colors may be different. The first light-diffusing device 130 may thereby be selectively designed to have a plurality of diffusion regions DR corresponding to each other, and hazes of at least part of the plurality of diffusion regions DR are set to be different. In this way, the light-emitting expansion angles and facula sizes of the coherent light beams 50R and 50B of different colors may be adjusted. For instance, in this embodiment, the coherent light beams 50R and 50B included in the coherent light beam 50I respectively are a red laser light beam and a blue laser light beam with a long wavelength, so the plurality of the diffusion regions DR of the first light-diffusing device 130 may correspondingly be set to be two regions. Moreover, at this time, the coherent light beams 50R and 50B of different colors may be synchronously controlled to emit light in different timing sequences, and the diffusion regions DR of the first light-diffusing device 130 may be set to correspondingly enter into transmission paths of the coherent light beams 50R and 50B by turns through the actuator 150. In this way, the coherent light beams 50R and 50B may be set to pass through the corresponding diffusion regions DR in timing sequences of light emission thereof. In this way, the light-emitting expansion angles of the coherent light beams 50R and 50B of different colors may be adjusted through haze control of the diffusion regions DR, and the coherent light beams 50R and 50B of different colors are set to enter the light uniforming device after forming faculae of identical sizes.

In this way, the faculae of the coherent light beam 50I generate two different light diffusion effects after passing through the light-diffusing surface DS of the optical module 120 and the first light-diffusing device 130. Moreover, the facula distribution of the coherent light beam 50I passing through the light-diffusing surface DS of the optical module 120 and the facula distribution of the coherent light beam 50I passing through the first light-diffusing device 130 are different. Therefore, after the faculae are superimposed, a facula exhibiting a uniform luminance is generated, so that the subsequently formed illumination light beam 70 has favorable uniformity. Further, due to the effect of persistence of vision, the luminance of a facula on an illuminated surface observed by human eyes is a luminance of faculae superimposed at different time points during the time of persistence of vision. Since the first light-diffusing device 130 may enable the facula distribution of the coherent light beam 50I to be changed over time, the facula distributions of the coherent light beam 50I passing through the first light-diffusing device 130 at different time points are different. Therefore, after the faculae at different time points during the persistence of vision are superimposed, a facula exhibiting a uniform luminance is generated as well, so that the subsequently formed illumination light beam 70 has more favorable uniformity. In this way, the projection apparatus 200 adopting the illumination system 100 can provide a display frame exhibiting a uniform luminance, so that image quality and a user's visual perception are further improved.

Next, as shown in FIG. 1A, in this embodiment, the coherent light beam 50I is transmitted onto a following light combining unit 140 after passing through the optical surface OS and the light-diffusing surface DS of the optical module 120 and the first light-diffusing device 130. Specifically, as shown in FIG. 1A, in this embodiment, the light combining unit 140 is located on the transmission path of the coherent light beam 50I passing through the first light-diffusing device 130. For instance, the light combining unit 140 may be a transflective device, a dichroic device, a polarizing beam splitting device, or any other devices capable of splitting a light beam or combining light beams. For instance, in this embodiment, the light combining unit 140, for example, allows a blue light beam and a red light beam to pass through and reflects light beams of other colors (e.g., green). In other words, the light combining unit 140 may allow the coherent light beam 50I to pass through and be combined with reflected light beams of different colors.

In another aspect, as shown in FIG. 1A, in this embodiment, the illumination system 100 further includes another excitation light source 160 and a wavelength conversion module 170. The excitation light source 160 is configured to emit an excitation light beam 50E, and the wavelength conversion module 170 is configured to convert the excitation light beam 50E into a conversion light beam 60. The light combining unit 140 is located between the excitation light source 110 and the wavelength conversion module 170 and is located on a transmission path of the excitation light beam 50E. In this way, the excitation light beam 50E may pass through the light combining unit 140 and is incident on the wavelength conversion module 170. For instance, in this embodiment, the excitation light source 110 is a laser light source, and the excitation light beam 50E is a blue laser light beam having a short wavelength, but the invention is not limited thereto.

Further, as shown in FIG. 1A, in this embodiment, the wavelength conversion module 170 is located on the transmission path of the excitation light beam 50E. The wavelength conversion module 170 may include a wavelength conversion layer (not shown), and a wavelength conversion region (not shown) may be formed on a substrate of the wavelength conversion module 170. As shown in FIG. 1A, in this embodiment, the excitation light beam 50E is incident on the wavelength conversion module 170 through a lens group (not labeled), is converted into the conversion light beam 60 through the wavelength conversion region of the wavelength conversion module 170, and is then transmitted to the light combining unit 140. Moreover, in this embodiment, the conversion light beam 60 is a green light beam and is reflected by the light combining unit 140 to be combined with the coherent light beam 50I, so that the illumination light beam 70 having three color light beams of red, green, and blue is formed and is then transmitted to the following optical devices.

Further, as shown in FIG. 1A, in this embodiment, the illumination system 100 further includes a light uniforming device 180. The light uniforming device 180 is located on an optical path at a downstream side after the coherent light beam 50I passes through the first light-diffusing device 130. For instance, in this embodiment, the light uniforming device 180 includes, for example, an integration rod, but the invention is not limited thereto. More specifically, as shown in FIG. 1A, when the illumination light beam 70 is transmitted to the light uniforming device 180, the light uniforming device 180 may set the illumination light beam 70 to be transmitted to the light valve 210 after uniforming the illumination light beam 70.

Next, as shown in FIG. 1A, the light valve 210 is located on the transmission path of the illumination light beam 70 and is configured to form the illumination light beam 70 into the image light beam 80. The projection lens 220 is located on a transmission path of the image light beam 80 and is configured to project the image light beam 80, so as to project the image light beam 80 onto a screen (not shown) to form an image frame.

In this embodiment, when the timing sequences of light emission of the coherent light beams 50R and 50B of different color and a timing sequence of light emission of the coherent light beam 60 are synchronously controlled to be different, a number of the light valve 210 may be one. After the coherent light beams 50R and 50B in the illumination light beam 70 and the conversion light beam 60 are incident on the light valve 210 in different timing sequences, the light valve 210 sequentially forms the illumination light beam 70 into the image light beam 80 having different colors and transmits the image light beam 80 to the projection lens 220. In this way, the projected image frame of the image light beam 80 converted by the light valve 210 may be a color frame. Nevertheless, the invention is not limited thereto.

In another situation, the timing sequences of light emission of the coherent light beams 50R and 50B and the timing sequence of light emission of the conversion light beam 60 may be set to be identical. At this time, a light splitting and combing device (not shown) may be disposed between the illumination system 100 and the light valve 210, and the number of the light valve 210 may be set to be plural (e.g., three light valves). Moreover, through arrangement of the light splitting and combing device, the illumination light beam 70 may be split into a red light beam, a green light beam, and a blue light beam of different colors, and the light beams are individually incident on the corresponding light valves 210. In this way, the plurality of light valves 210 may synchronously form the red light beam, the green light beam, and the blue light beam in the illumination light beam 70 into the image light beam 80 having different colors and transmits the image light beam 80 to the projection lens 220. The projected image frame of the image light beam 80 converted by the light valve 210 may be a color frame as well.

Note that in the foregoing embodiments, the illumination light beam 70 is exemplified as having the coherent light beam 50I and the conversion light beam 60, but the invention is not limited thereto. In an embodiment that is not shown, the illumination light beam 70 may be formed by the coherent light beam 50I only. That is, the coherent light source 110 includes three sub-coherent light sources, and theses sub-coherent light sources respectively are a blue laser light beam providing a long wavelength, a green laser light beam, and a red laser light beam. In this way, the illumination light beam 70 having three color light beams of red, green, and blue is formed. Other embodiments are described for illustration in the following.

Figure 2A:
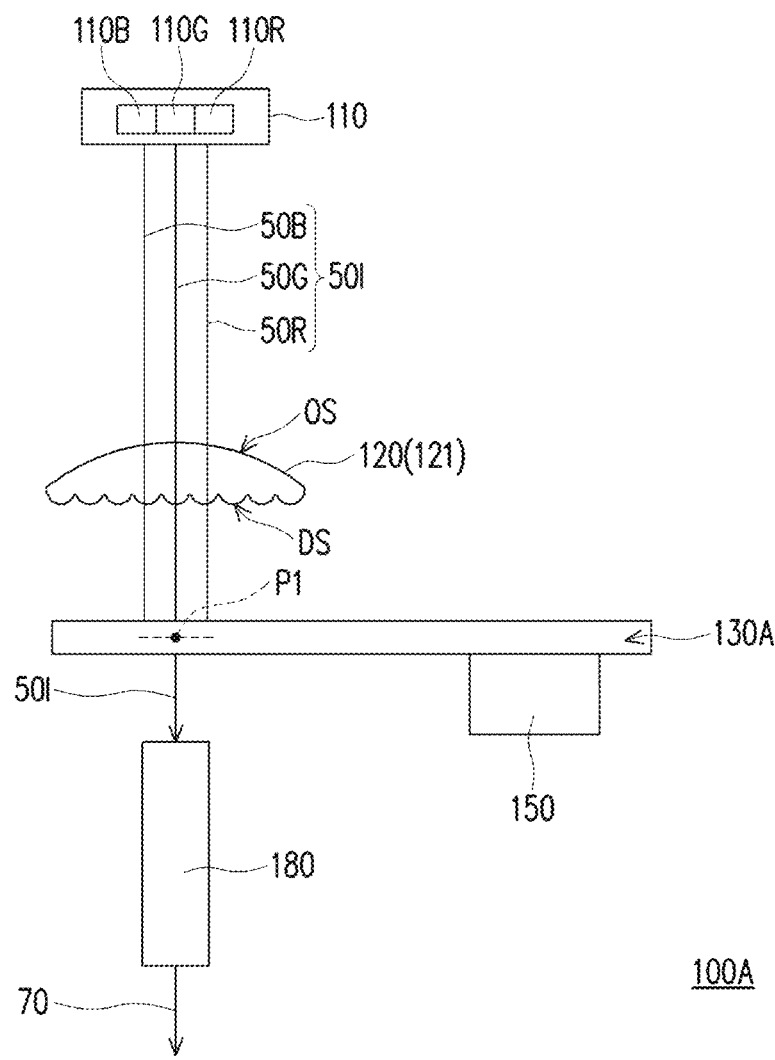
FIG. 2A is a schematic view of a structure of another illumination system according to an embodiment of the invention.
Figure 2B:
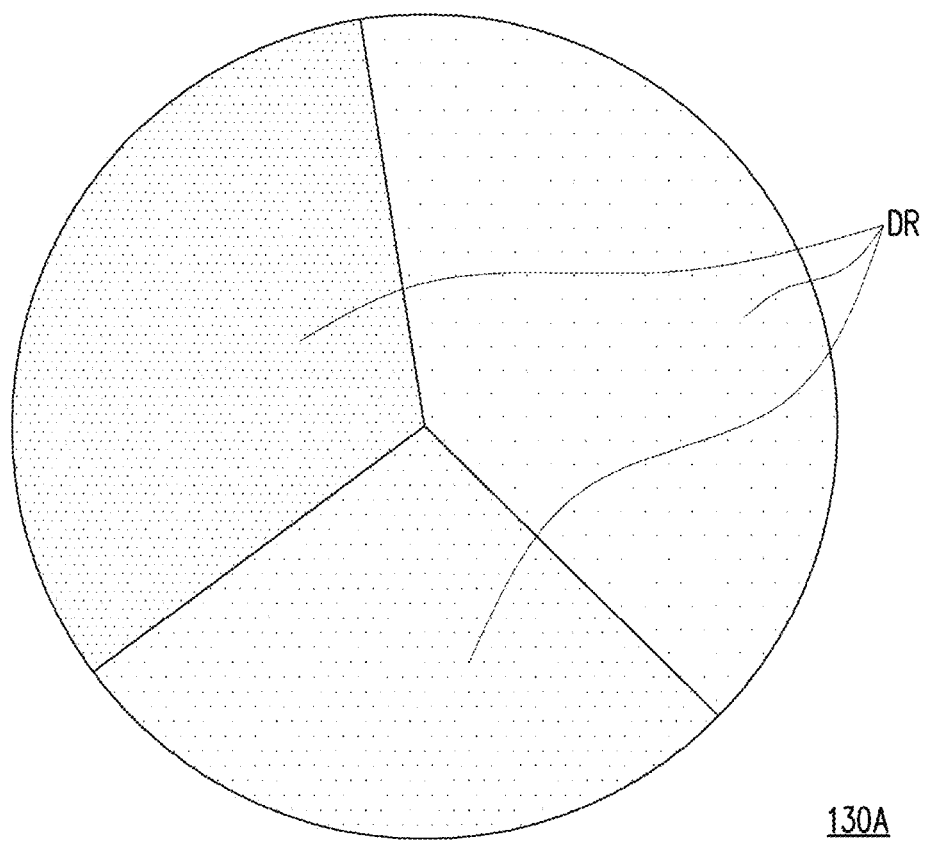
FIG. 2B is a schematic top view of a first light-diffusing device of FIG. 2A.

FIG. 2A is a schematic view of a structure of another illumination system according to an embodiment of the invention. FIG. 2B is a schematic top view of a first light-diffusing device of FIG. 2A. With reference to FIG. 2A, an illumination system 100A of FIG. 2A is similar to the illumination system 100 of FIG. 1A, and a difference therebetween is described as follows. Specifically, as shown in FIG. 2A, in this embodiment, a coherent light source 110A of the illumination system 100A includes sub-coherent light sources 110R, 110G, and 110B. Coherent light beams 50R, 50G, and 50B respectively provided by the sub-coherent light sources 110R, 110G, and 110B respectively are a red laser light beam, a green laser light beam, and a blue laser light beam having a long wavelength, so that red light, green light, and blue light parts of the illumination light beam 70 are thereby formed. In this way, since the green light part of the illumination light beam 70 is not required to be formed through the conversion light beam 60, arrangement of the excitation light source 160 and the wavelength conversion module 170 may be omitted in the illumination system 100A in this embodiment. Moreover, since the conversion light beam 60 is not required to be combined with the coherent light beam 50I in this embodiment, arrangement of the light combining unit 140 may be further omitted in the illumination system 100A.

Moreover, as shown in FIG. 2A and FIG. 2B, a first light-diffusing device 130A in this embodiment is similar to the first light-diffusing device 130 in FIG. 1A and FIG. 1F, and a difference therebetween is described as follows. Since the coherent light beam 50I includes three coherent light beams 50R, 50G, and 50B of different colors, a plurality of diffusion regions DR of the first light-diffusing device 130A may correspondingly set to be three regions. Moreover, timing sequences of light emission of the coherent light beams 50R, 50G, and 50B of different colors may be synchronously controlled, and the diffusion regions DR of the first light-diffusing device 130A may be set to correspondingly enter into the transmission paths of the coherent light beams 50R, 50G, and 50B by turns through the actuator 150. In this way, the coherent light beams 50R, 50G, and 50B may be set to pass through the corresponding diffusion regions DR in the timing sequences of light emission thereof. In this way, the light-emitting expansion angles of the coherent light beams 50R, 50G, and 50B of different colors may be adjusted through haze control of the diffusion regions DR, and the coherent light beams 50R, 50G, and 50B of different colors are set to enter the light uniforming device after forming faculae of identical sizes.

Next, as shown in FIG. 2A, in this embodiment, the coherent light beam 50I may directly enter the light uniforming device 180 after passing through the first light-diffusing device 130A. That is, in this embodiment, the light uniforming device 180 is located in vicinity of the first light-diffusing device 130A and the first position P1. For instance, a distance between the light uniforming device 180 and the first light-diffusing device 180 or a distance between the light uniforming device 180 and the first position P1 is less than 5 millimeters. In this way, in the illumination system 100A, an optical path may be further simplified and apparatus volume may be further reduced, and the illumination light beam 70 having red, green, and blue light beams and exhibiting favorable uniformity is formed. As such, the illumination system 100A may feature effects and advantages similar to that provided by the illumination system 100, and similar description is thus omitted herein. Furthermore, when the illumination system 100A is applied to the projection apparatus 200 of FIG. 1A, the projection apparatus 200 may thereby feature the aforementioned effects and advantages, and similar description is thus omitted herein.

Figure 3:
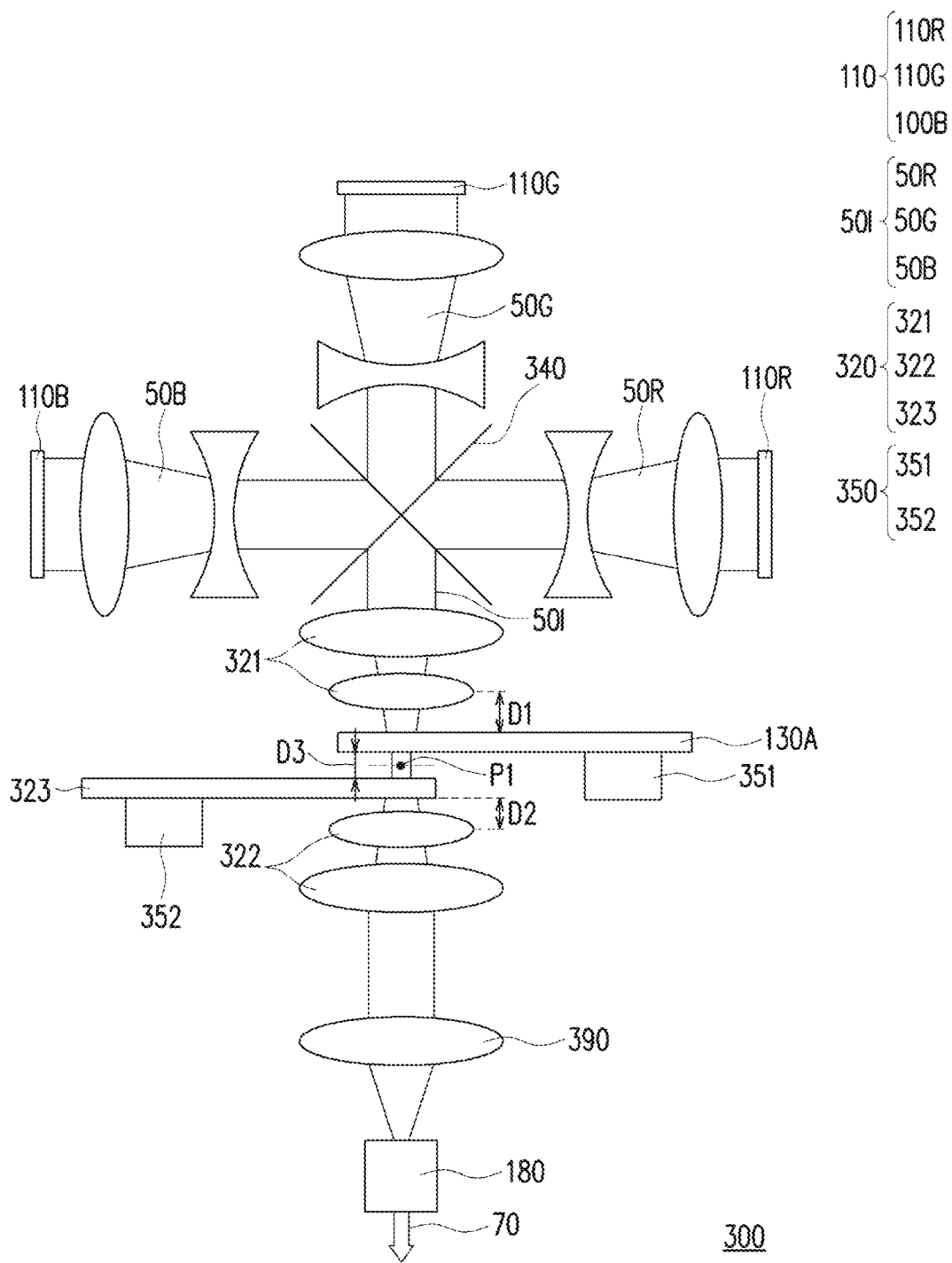
FIG. 3 is a schematic view of a structure of another illumination system according to an embodiment of the invention.

FIG. 3 is a schematic view of a structure of another illumination system according to an embodiment of the invention. With reference to FIG. 3, an illumination system 300 of FIG. 3 is similar to the illumination system 100 of FIG. 1A, and a difference therebetween is described as follows. Specifically, as shown in FIG. 3, in this embodiment, the coherent light source 110 includes three laser light sources, that is, the sub-coherent light sources 110R, 110G, and 110B configured to respectively provide the coherent light beams 50R, 50G, and 50B of different colors. A light combining unit 340 of the illumination system 300 is located on the transmission path of each of the coherent light beams 50R, 50G, and 50B. Herein, each of the coherent light beams 50R, 50G, and 50B travels in the same direction after passing through the light combining unit 340 and is incident on the optical module 320 and the first light-diffusing device 130. Herein, the light combining unit 340 of this embodiment is, for example, an X-plate and is configured to reflect the coherent light beams 50R and 50B and allow the coherent light beam 50G to pass through, so that the coherent light beams 50R, 50G, and 50B are combined behind the light combining unit 340. Specifically, the first light-diffusing device 130A in this embodiment is identical to the first light-diffusing device 130A of FIG. 2A and FIG. 2B.

Specifically, as shown in FIG. 3, in this embodiment, an optical module 320 includes a first lens 321, a second lens 322, and a second light-diffusing device 323. All of the first lens 321, the second lens 322, and the second light-diffusing device 323 are located on the transmission path of the coherent light beam 50I, and the second light-diffusing device 323 is located between the first lens 321 and the second lens 322. More specifically, as shown in FIG. 3, in this embodiment, the coherent light beam 50I focuses on a first focus of the first lens 321 after being collimated by the first lens 321, and a position of the first focus is the first position P1. In other words, in this embodiment, the optical surface OS is a surface of the first lens 321. In another aspect, the second lens 322 is located on the transmission path of the coherent light beam 50I. Herein, the coherent light beam 50I passes through a second focus of the second lens 322 and is diffused and collimated through the second lens 322. For instance, in this embodiment, the first lens 321 or the second lens 322 may be a single lens or a lens group in which a plurality of lenses are combined, but the invention is not limited thereto. As long as the coherent light beam 50I may focus after being collimated through the first lens 321 and the coherent light beam 50I may be diffused and collimated through the second lens 322. In addition, in this embodiment, the second lens 322 and the first lens 321 may be confocal, that is, the first focus may be the second focus, but the invention is not limited thereto. In some other embodiments, the second focus may be located in vicinity of the first focus.

In another aspect, the second light-diffusing device 323 in this embodiment may be similar to the first light-diffusing device 130 of FIG. 1A or the first light-diffusing device 130A of FIG. 2A and may be a diffusion plate having a surface filled with particles of different roughness. A haze of the first light-diffusing device 130 and a haze of the second light-diffusing device 323 are different from each other. In this way, a light diffusion effect generated by the coherent light beam 50I when passing through the second light-diffusing device 323 is different from that generated by the coherent light beam 50I when passing through the first light-diffusing device 130. In other words, in this embodiment, the light-diffusing surface DS is disposed on the second light-diffusing device 323. Moreover, as described above, at least one of the first light-diffusing device 130A and the second light-diffusing device 323 has a plurality of diffusion regions DR. The actuator 350 is configured to set the diffusion regions DR in at least one of the light-diffusing surface DS of the first light-diffusing surface device 130A and the second light-diffusing device 323 to correspondingly enter into the transmission paths of the sub-coherent light beams 50R, 50G, and 50B by turns. In this way, through haze control of the diffusion regions DR, the coherent light beams 50R, 50G, and 50B of different colors are set to enter the light uniforming device after forming faculae of identical sizes.

Specifically, as shown in FIG. 3, in this embodiment, the second light-diffusing device 323 is also located in the vicinity of the first position P1. Moreover, a distance D3 between the second light-diffusing device 323 and the first light-diffusing device 130A is less than a distance D1 between the first light-diffusing device 130A and the first lens 321 or a distance D2 between the second light-diffusing device 323 and the second lens 322. For instance, in this embodiment, the distance between the first light-diffusing device 130A and the second light-diffusing device 323 and a distance between the first focus (i.e., the first position P1) and the second focus are both less than 5 millimeters. In this way, sizes of faculae diffused through the first light-diffusing device 130A and the second light-diffusing device 323 are not too large to affect light receiving efficiency of a following light uniforming device.

In another aspect, as shown in FIG. 3, in this embodiment, the illumination system 300 further includes a focusing device 390. The focusing device 390 is located on the transmission path of the coherent light beam 50I from the second lens 322, and the light uniforming device 180 is located on the transmission path of the coherent light beam 50I from the focusing device 390. As such, after the coherent light beam 50I passes through the first lens 321, the first light-diffusing device 130A, the second light-diffusing device 323, and the second lens 322 in sequence, the facula of the coherent light beam 50I is focused and received into the light uniforming device 180 through the focusing device 390. In this way, the faculae of the coherent light beam 50I generates two different light diffusion effects after passing through the first light-diffusing device 130A and the light-diffusing surface DS of the second light-diffusing device 323 of the optical module 320. Moreover, the facula distribution of the coherent light beam 50I passing through the light-diffusing surface DS of the second light-diffusing device 323 of the optical module 320 and the facula distribution of the coherent light beam 50I passing through the first light-diffusing device 130A are different. Therefore, after the faculae are superimposed, a facula exhibiting a uniform luminance is generated, so that the subsequently formed illumination light beam 70 has favorable uniformity.

In addition, note that in the foregoing embodiments, although only the movement process of the first light-diffusing device 130 driven by the actuator 350 is exemplified, the invention is not limited thereto. In this embodiment, the actuator 350 may drive the second light-diffusing device 323 to move or may simultaneously drive the first light-diffusing device 130 and the second light-diffusing device 323 to move. Details are further described as follows.

As shown in FIG. 3, in this embodiment, the actuator 350 includes a first actuator 351 and a second actuator 352. The first actuator 351 is electrically connected to the first light-diffusing device 130A and is configured to drive the first light-diffusing device 130A to move. The second actuator 352 is electrically connected to the second light-diffusing device 323 of the optical module 320 and is configured to drive the light-diffusing surface DS of the second light-diffusing device 323 of the optical module 320 to move. When the second actuator 352 drives the second light-diffusing device 323 to move, the movement process is similar to the movement process of the first light-diffusing device 130A provided in the foregoing embodiments, and since related description can be found with reference to the foregoing paragraphs, it is not repeated herein.

Further, in this embodiment, when the first actuator 351 and the second actuator 352 of the actuator 350 simultaneously set the first light-diffusing device 130A and the second light-diffusing device 323 to move, a moving direction of the first light-diffusing device 130A and a moving direction of the second light-diffusing device 323 may be set to be identical or different. Alternatively, an operation frequency of the first light-diffusing device 130A and an operation frequency of the second light-diffusing device 323 may be set to be identical or different.

More specifically, when the first actuator 351 is configured to set the first light-diffusing device 130A to move and the second actuator 352 is configured to set the light-diffusing surface DS of the second light-diffusing device 323 of the optical module 320 to move, and when the moving direction of the first light-diffusing device 130A and the moving direction of the light-diffusing surface DS of the second light-diffusing device 323 of the optical module 320 are different from each other, a difference in light diffusion effects between the first light-diffusing device 130A and the second light-diffusing device 323 changes over time as well. As such, after the faculae at different time points during the persistence of vision are superimposed, a facula exhibiting a uniform luminance is generated as well, so that the subsequently formed illumination light beam 70 has more favorable uniformity.

Moreover, similarly, when the first actuator 351 is configured to drive the first light-diffusing device 130A to rotate at the first frequency and the second actuator 352 is configured to set the light-diffusing surface DS of the second light-diffusing device 323 of the optical module 320 to rotate at the second frequency, and when the first frequency and the second frequency are different from each other, a difference in the light diffusion effects between the first light-diffusing device 130A and the second light-diffusing device 323 changes over time as well. As such, after the faculae at different time points during the persistence of vision are superimposed, a facula exhibiting a uniform luminance is generated as well, so that the subsequently formed illumination light beam 70 has more favorable uniformity.

In this way, two different light diffusion effects may also be generated through arrangement of the light-diffusing surface DS of the second light-diffusing device 323 of the optical module 320 and the first light-diffusing device 130A in the illumination system 300. A facula exhibiting a uniform luminance is accordingly generated, so that the subsequently formed illumination light beam 70 has favorable uniformity. As such, the illumination system 300 may feature effects and advantages similar to that provided by the illumination system 100, and similar description is thus omitted herein. Furthermore, when the illumination system 300 is applied to the projection apparatus 200 of FIG. 1A, the projection apparatus 200 may thereby feature the aforementioned effects and advantages, and similar description is thus omitted herein.

Figure 4A:
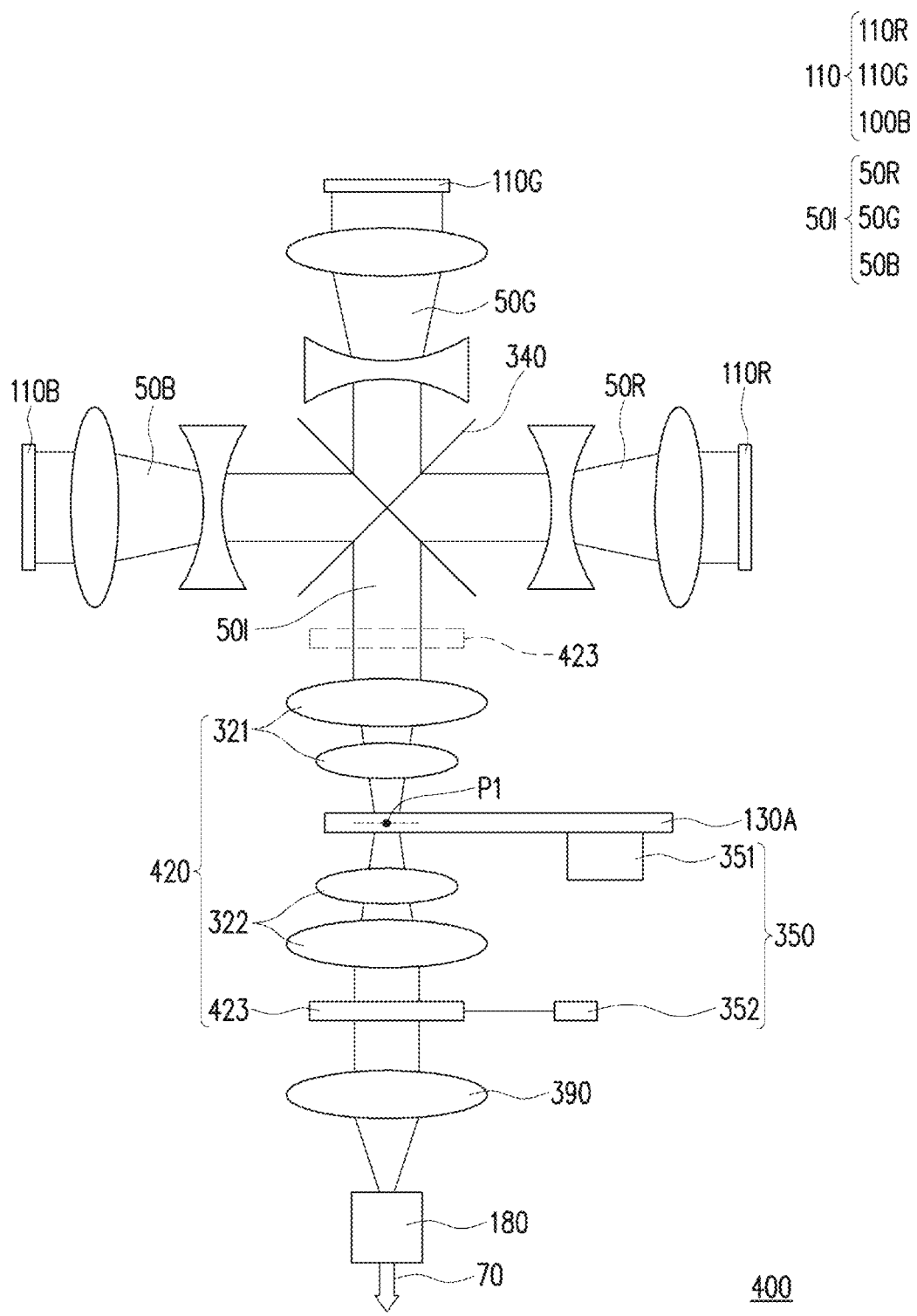
FIG. 4A is a schematic view of a structure of still another illumination system according to an embodiment of the invention.
Figure 4B:
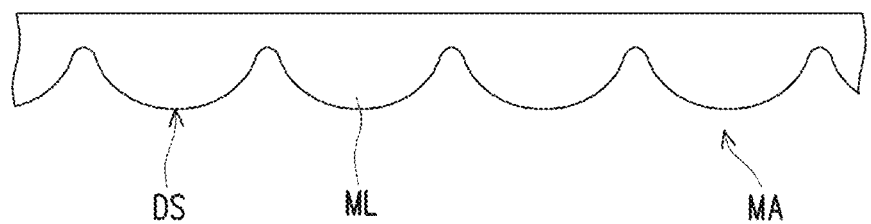
FIG. 4B is a schematic side view of a second light-diffusing device of FIG. 4A.

FIG. 4A is a schematic view of a structure of still another illumination system according to an embodiment of the invention. FIG. 4B is a schematic side view of a second light-diffusing device of FIG. 4A. With reference to FIG. 4A, an illumination system 400 of FIG. 4A is similar to the illumination system 300 of FIG. 3, and a difference therebetween is described as follows. Specifically, as shown in FIG. 4B, in this embodiment, a second light-diffusing device 423 is similar to the optical lens 121 of FIG. 1F, and the micro lens array MA may be formed on at least one surface of the second light-diffusing device 423. A difference is that the surface of the second light-diffusing device 423 on which the micro lens array MA is not formed is a flat surface. In this way, the light diffusion effect generated by the coherent light beam 50I when passing through the second light-diffusing device 423 is different from that generated by the coherent light beam 50I when passing through the first light-diffusing device 130 as well. In other words, in this embodiment, the light-diffusing surface DS is disposed on the second light-diffusing device 423 and is the surface of the micro lens array MA formed on the second light-diffusing device 423.

Moreover, as shown in FIG. 4A and FIG. 4B, in this embodiment, a favorable light diffusion effect can be obtained when a device is located on a traveling path of the coherent light beam 50I being a collimated light beam when the micro lens array MA is formed on the light-diffusing surface DS. Therefore, the second light-diffusing device 423 is located between the second lens 322 and the focusing device 390 and is disposed on the traveling path of the coherent light beam 50I being collimated through the second lens 322. That is, in this embodiment, the second light-diffusing device 423 is located at a downstream side of the first light-diffusing device 130A. The coherent light beam 50I from the coherent light source 110 passes through the light uniforming device 180 after passing through the first lens 321, the first light-diffusing device 130A, the second lens 322, the second light-diffusing device 423, and the focusing device 390 in sequence. Nevertheless, the invention is not limited thereto.

In an embodiment that is not shown, the second light-diffusing device 423 may also be located between coherent light source 110 and the first lens 321 and is located on the traveling path of the coherent light beam 50I before being collimated as being focused by the first lens 321. In this embodiment, the second light-diffusing device 423 is located on an upstream side of the first light-diffusing device 130A. The coherent light beam 50I passes through the light uniforming device 180 after passing through the second light-diffusing device 423, the first lens 321, the first light-diffusing device 130A, the second lens 322, and the focusing device 390 in sequence. Similar light diffusion effect is achieved as well.

In this way, the faculae of the coherent light beam 50I generates two different light diffusion effects after passing through the first light-diffusing device 130A and the light-diffusing surface DS of the second light-diffusing device 423 of the optical module 420. Moreover, the facula distribution of the coherent light beam 50I passing through the light-diffusing surface DS of the second light-diffusing device 423 of the optical module 420 and the facula distribution of the coherent light beam 50I passing through the first light-diffusing device 130A are different. Therefore, after the faculae are superimposed, a facula exhibiting a uniform luminance is generated, so that the subsequently formed illumination light beam 70 has favorable uniformity.

Moreover, note that in this embodiment, in addition to driving the first light-diffusing device 130A to move, the actuator 350 may also drive the second light-diffusing device 423 to move. Movement of the second light-diffusing device 423 is similar to that of the second light-diffusing device 323 of FIG. 3, and a difference therebetween is provided as follows.

In this embodiment, the second light-diffusing device 423 may be designed to have a plurality of corresponding diffusion regions DR. Each of the diffusion regions DR has a specific center-to-center spacing of the micro lens array MA or a curvature of the micro lens ML. Moreover, the center-to-center spacings of the micro lens array MA or the curvatures the micro lens ML of at least part of the plurality of diffusion regions DR of the micro lens array are different from each other. As such, when the timing sequences of light emission of the coherent light beams 50R, 50G, and 50B of different colors are synchronously controlled, and when the diffusion regions DR of the second light-diffusing device 423 are set to correspondingly enter into the transmission paths of the coherent light beams 50R, 50G, and 50B by turns through the second actuator 352 of the actuator 350, the light-emitting expansion angles and facula sizes of the coherent light beams 50R, 50G, and 50B of different colors may be adjusted. The coherent light beams 50R, 50G, and 50B of different colors are thereby set to enter the light uniforming device after forming faculae of identical sizes.

Moreover, in this embodiment, synchronous driving of movement of the first light-diffusing device 130A and the second light-diffusing device 423 performed by the first actuator 351 and the second actuator 352 of the actuator 350 is similar to that provided in the embodiments of FIG. 3, and related description can be found with reference to aforementioned paragraphs and is not repeated herein.

In this way, two different light diffusion effects may also be generated through arrangement of the light-diffusing surface DS of the second light-diffusing device 423 of the optical module 420 and the first light-diffusing device 130 in the illumination system 400. A facula exhibiting a uniform luminance is accordingly generated, so that the subsequently formed illumination light beam 70 has favorable uniformity. As such, the illumination system 400 may feature effects and advantages similar to that provided by the illumination system 300, and similar description is thus omitted herein. Furthermore, when the illumination system 400 is applied to the projection apparatus 200 of FIG. 1A, the projection apparatus 200 may thereby feature the aforementioned effects and advantages, and similar description is thus omitted herein.

In view of the foregoing, the embodiments of the invention have at least one of the following advantages or effects. In the embodiments of the invention, the illumination system may generate two different light diffusion effects through arrangement of the light-diffusing surface of the optical module and the first light-diffusing device and accordingly generates faculae exhibiting a uniform luminance, so that the subsequently formed illumination light beam has favorable uniformity. In this way, the projection apparatus adopting the illumination system can provide a display frame exhibiting a uniform luminance, and image quality and a user's visual perception therefore are further improved.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system, configured to provide an illumination light beam, comprising a coherent light source, an optical module, a first light-diffusing device, and an actuator, wherein,
    the coherent light source is configured to emit a coherent light beam,
    the optical module is located on a transmission path of the coherent light beam, wherein the optical module has an optical surface and a light-diffusing surface, the coherent light beam focuses on a first position through the optical surface of the optical module,
    the first light-diffusing device is located on the transmission path of the coherent light beam and is located at the first position or in vicinity of the first position, and
    the actuator is electrically connected to the first light-diffusing device and is configured to drive the first light-diffusing device to move, wherein the coherent light beam passes through the first light-diffusing device so that a diffusion angle of the coherent light beam is sequentially changed, and the coherent light beam passes through the optical module and the first light-diffusing device so that the illumination light beam is formed,
    wherein the optical module comprises a first lens, a second lens, and a second light-diffusing device, wherein
    the first lens is located on the transmission path of the coherent light beam, wherein the coherent light beam focuses on a first focus of the first lens after being collimated through the first lens, a position of the first focus is the first position, and the optical surface is a surface of the first lens,
    the second lens is located on the transmission path of the coherent light beam, wherein the coherent light beam passes through a second focus of the second lens and is diffused and collimated through the second lens, and the first light-diffusing device is located between the first lens and the second lens,
    the second light-diffusing device is located on the transmission path of the coherent light beam, wherein the light-diffusing surface is disposed on the second light-diffusing device.

2. The illumination system of claim 1, further comprising a light uniforming device, located on an optical path at a downstream side after coherent light beam passes through the first light-diffusing device.

3. The illumination system of claim 1, wherein the second light-diffusing device is located between the first lens and the second lens, and the coherent light beam passes through the first lens, the first light-diffusing device, the second light-diffusing device, and the second lens in sequence.

4. The illumination system of claim 1, wherein the second light-diffusing device is located in vicinity of the first position.

5. The illumination system of claim 1, wherein a distance between the second light-diffusing device and the first light-diffusing device is less than a distance between the first light-diffusing device and the first lens or a distance between the second light-diffusing device and the second lens.

6. The illumination system of claim 1, further comprising:
    a focusing device and a light uniforming device, wherein
    the focusing device is located on the transmission path of the coherent light beam from the second lens, and
    the light uniforming device is located on the transmission path of the coherent light beam from the focusing device.

7. The illumination system of claim 1, wherein a haze of the first light-diffusing device and a haze of the second light-diffusing device are different from each other.

8. The illumination system of claim 1, wherein a micro lens array is formed on the light-diffusing surface, and the illumination system further comprises a focusing device and a light uniforming device, wherein
    the second light-diffusing device is located between the second lens and the focusing device, and
    the light uniforming device is located on the transmission path of the coherent light beam from the focusing device, wherein the coherent light beam passes through the light uniforming device after passing through the first lens, the first light-diffusing device, the second lens, the second light-diffusing device, and the focusing device in sequence.

9. A projection apparatus, wherein the projection apparatus comprises an illumination system, a light valve, and a projection lens, wherein
    the illumination system is configured to provide an illumination light beam, and the illumination system comprises a coherent light source, an optical module, a first light-diffusing device, and an actuator, wherein,
    the coherent light source is configured to emit a coherent light beam,
    the optical module is located on a transmission path of the coherent light beam, wherein the optical module has an optical surface and a light-diffusing surface, and the coherent light beam focuses on a first position through the optical surface of the optical module,
    the first light-diffusing device is located on the transmission path of the coherent light beam and is located at the first position or in vicinity of the first position, and
    the actuator is electrically connected to the first light-diffusing device and is configured to drive the first light-diffusing device to move, wherein the coherent light beam passes through the first light-diffusing device so that a diffusion angle of the coherent light beam is sequentially changed, and the coherent light beam passes through the optical module and the first light-diffusing device so that the illumination light beam is formed,
    the light valve is disposed on a transmission path of the illumination light beam from the illumination system and is configured to convert the illumination light beam into an image light beam, and
    the projection lens is disposed on a transmission path of the image light beam and is configured to project the image light beam out of the projection apparatus, wherein the optical module comprises a first lens, a second lens, and a second light-diffusing device, wherein the first lens is located on the transmission path of the coherent light beam, wherein the coherent light beam focuses on a first focus of the first lens after being collimated through the first lens, a position of the first focus is the first position, and the optical surface is a surface of the first lens, the second lens is located on the transmission path of the coherent light beam, wherein the coherent light beam passes through a second focus of the second lens and is diffused and collimated through the second lens, and the first light-diffusing device is located between the first lens and the second lens, and the second light-diffusing device is located on the transmission path of the coherent light beam, wherein the light-diffusing surface is disposed on the second light-diffusing device.

10. An illumination system, configured to provide an illumination light beam, comprising a coherent light source, an optical module, a first light-diffusing device, and an actuator, wherein, the coherent light source is configured to emit a coherent light beam, the optical module is located on a transmission path of the coherent light beam, wherein the optical module has an optical surface and a light-diffusing surface, the coherent light beam focuses on a first position through the optical surface of the optical module, the first light-diffusing device is located on the transmission path of the coherent light beam and is located at the first position or in vicinity of the first position, and the actuator is electrically connected to the first light-diffusing device and is configured to drive the first light-diffusing device to move, wherein the coherent light beam passes through the first light-diffusing device so that a diffusion angle of the coherent light beam is sequentially changed, and the coherent light beam passes through the optical module and the first light-diffusing device so that the illumination light beam is formed, wherein the actuator comprises a first actuator and a second actuator, the first actuator is electrically connected to the first light-diffusing device and is configured to drive the first light-diffusing device to move, and the second actuator is electrically connected to the optical module and is configured to drive the light-diffusing surface of the optical module to move.

11. The illumination system of claim 10, wherein the first actuator is configured to set the first light-diffusing device to move, the second actuator is configured to set the light-diffusing surface of the optical module to move, and a moving direction of the first light-diffusing device and a moving direction of the light-diffusing surface of the optical module are different from each other.

12. The illumination system of claim 10, wherein the first actuator is configured to drive the first light-diffusing device to rotate at a first frequency, the second actuator is configured to drive the light-diffusing surface of the optical module to rotate at a second frequency, and the first frequency and the second frequency are different from each other.

13. The illumination system of claim 10, wherein the coherent light source comprises a plurality of sub-coherent light sources, the sub-coherent light sources are configured to emit sub-coherent light beams, colors of the sub-coherent light beams are different from each other, each of the sub-coherent light beams travels in the same direction to form the coherent light beam and is incident into the optical module and the first light-diffusing device, at least one of the light-diffusing surface and the first light-diffusing device has a plurality of diffusion regions, and the first actuator or the second actuator is configured to set the plurality of diffusion regions of at least one of the first light-diffusing device and the light-diffusing surface of the optical module to correspondingly enter into transmission paths of the sub-coherent light beams by turns.

14. The illumination system of claim 13, wherein hazes of at least part of the plurality of diffusion regions are different from each other.

15. The illumination system of claim 13, wherein each of the plurality of diffusion regions of a micro lens array has a center-to-center spacing of the micro lens array or a curvature of a micro lens when the micro lens array is formed on the light-diffusing surface, and the center-to-center spacings of the micro lens array or the curvatures the micro lens of at least part of the plurality of diffusion regions of the micro lens array are different from each other.

16. The projection apparatus of claim 9, wherein the second light-diffusing device is located between the first lens and the second lens, and the second light-diffusing device is located in vicinity of the first position, a distance between the second light-diffusing device and the first light-diffusing device is less than a distance between the first light-diffusing device and the first lens or a distance between the second light-diffusing device and the second lens, and the coherent light beam passes through the first lens, the first light-diffusing device, the second light-diffusing device, and the second lens in sequence.

17. The projection apparatus of claim 9, wherein a micro lens array is formed on the light-diffusing surface, and the illumination system further comprises a focusing device, wherein the second light-diffusing device is located between the second lens and the focusing device, wherein the coherent light beam passes through the first lens, the first light-diffusing device, the second lens, the second light-diffusing device, and the focusing device in sequence.

18. A projection apparatus, wherein the projection apparatus comprises an illumination system, a light valve, and a projection lens, wherein the illumination system is configured to provide an illumination light beam, and the illumination system comprises a coherent light source, an optical module, a first light-diffusing device, and an actuator, wherein, the coherent light source is configured to emit a coherent light beam, the optical module is located on a transmission path of the coherent light beam, wherein the optical module has an optical surface and a light-diffusing surface, and the coherent light beam focuses on a first position through the optical surface of the optical module, the first light-diffusing device is located on the transmission path of the coherent light beam and is located at the first position or in vicinity of the first position, and the actuator is electrically connected to the first light-diffusing device and is configured to drive the first light-diffusing device to move, wherein the coherent light beam passes through the first light-diffusing device so that a diffusion angle of the coherent light beam is sequentially changed, and the coherent light beam passes through the optical module and the first light-diffusing device so that the illumination light beam is formed, the light valve is disposed on a transmission path of the illumination light beam from the illumination system and is configured to convert the illumination light beam into an image light beam, and the projection lens is disposed on a transmission path of the image light beam and is configured to project the image light beam out of the projection apparatus, wherein the actuator comprises a first actuator and a second actuator, the first actuator is electrically connected to the first light-diffusing device and is configured to drive the first light-diffusing device to move, and the second actuator is electrically connected to the optical module and is configured to drive the light-diffusing surface of the optical module to move.

19. The projection apparatus of claim 18, wherein the coherent light source comprises a plurality of sub-coherent light sources, the sub-coherent light sources are configured to emit sub-coherent light beams, colors of the sub-coherent light beams are different from each other, each of the sub-coherent light beams travels in the same direction to form the coherent light beam and is incident on the optical module and the first light-diffusing device, at least one of the light-diffusing surface and the first light-diffusing device has a plurality of diffusion regions, and the first actuator or the second actuator is configured to set the plurality of diffusion regions of at least one of the first light-diffusing device and the light-diffusing surface of the optical module to correspondingly enter into transmission paths of the sub-coherent light beams by turns.

20. The projection apparatus of claim 19, wherein hazes of at least part of the plurality of diffusion regions are different from each other.

21. The projection apparatus of claim 19, wherein each of the plurality of diffusion regions of a micro lens array has a center-to-center spacing of the micro lens array or a surface curvature of a micro lens when the micro lens array is formed on the light-diffusing surface, and the center-to-center spacings of the micro lens array or the surface curvatures of the micro lens of at least part of the plurality of diffusion regions of the light-diffusing surface are different from each other.

* * * * *